US012801303B1

(12) United States Patent
Gordon et al.

(10) Patent No.: US 12,801,303 B1
(45) Date of Patent: Nov. 17, 2026

(54) DUPLICATING A FILE PORTION RESIDING IN A WRITE BUFFER OF A STORAGE SYSTEM

(71) Applicant: VAST DATA LTD., Tel Aviv (IL)

(72) Inventors: Eyal Gordon, Tel Aviv (IL); Avi Goren, Tel Aviv (IL); Ori Mamluk, Tel Aviv (IL); Asaf Weissman, Tel Aviv (IL); Amir Miron, Tel Aviv (IL); Noam Inbar, Tel Aviv (IL); Roman Boguslavsky, Tel Aviv (IL); Alexey Rastvortsev, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 19/084,645

(22) Filed: Mar. 19, 2025

(51) Int. Cl.
*G06F 3/06* (2006.01)

(52) U.S. Cl.
CPC ............ *G06F 3/065* (2013.01); *G06F 3/0604* (2013.01); *G06F 3/0656* (2013.01); *G06F 3/0679* (2013.01)

(58) Field of Classification Search
CPC ...... G06F 3/065; G06F 3/0604; G06F 3/0656; G06F 3/0679
USPC .......................................................... 707/827
See application file for complete search history.

(56) References Cited

U.S. PATENT DOCUMENTS

| | | | | |
|---|---|---|---|---|
| 8,117,160 | B1 * | 2/2012 | Tang | G06F 16/128 707/649 |
| 2016/0105504 | A1 * | 4/2016 | Vallabhaneni | H04L 67/1095 709/217 |
| 2016/0292178 | A1 * | 10/2016 | Manville | G06F 16/1752 |
| 2018/0267985 | A1 * | 9/2018 | Badey | G06F 16/128 |
| 2021/0064484 | A1 * | 3/2021 | Dornemann | G06F 11/1464 |

FOREIGN PATENT DOCUMENTS

| | | | | |
|---|---|---|---|---|
| AU | 2010266433 B2 | * | 2/2013 | H04L 67/1097 |
| CN | 101154234 A | * | 4/2008 | G06F 3/065 |

* cited by examiner

*Primary Examiner* — Hicham Skhoun
(74) *Attorney, Agent, or Firm* — Reches Patents

(57) ABSTRACT

A method for duplicating a storable sub-element of a first storable element, the method includes (i) receiving, by a processing circuit, a request to copy the storable sub-element to a second storable element; wherein the receiving occurs while a write buffer of a storage system stores a content of the storable sub-element; wherein the storage system also stores a first storable element metadata regarding the first storable element, the first storable element metadata comprises storable sub-element metadata that includes a storable sub-element location indicator that is indicative of location of the storable sub-element within the write buffer; and (ii) responding the request. The responding includes generating, in association with second storable element metadata regarding the second information element, a second storable sub-element metadata that is indicative of the storable sub-element; updating the first storable element metadata to indicate that the storable sub-element is shared with the second storable element; and sending an indication that a duplicating of the storable sub-element is completed following the updating and the generating.

19 Claims, 7 Drawing Sheets

Metadata of file X at T1
10A

Metadata of file Y at T2
12A a. Block 1
- i. Version 1
  1. Data
  2. Physical location
  3. Length

---

- ii. Version n
  1. Data
  2. Physical location
  3. Length

--- b. Block k
- i. Version 1
  1. Data
  2. Physical location
  3. Length

---

- ii. Version m
  1. Data
  2. Physical location
  3. Length

Metadata of file X at T1

10A

FIG. 1A

Block k ii. Version m

1. Data
2. Physical location (see metadata of file X)
3. Length

Metadata of file Y at T2

12A

FIG. 1B a. Block 1
   i. Version 1
      1. Data
      2. Physical location
      3. Length

--- ii. Version n
      1. Data
      2. Physical location
      3. Length

--- b. Block k
   i. Version 1
      1. Data
      2. Physical location
      3. Length

--- ii. Version m
      1. Data
      2. Physical location
      3. Length m'th version of the k'th block shared with file Y

Metadata of file X at T2

10B

FIG. 1C

Block k ii. Version m

1. Data
2. Physical location (*in long term storage*)
3. Length

Metadata of file Y at T3

12C

FIG. 1D a. Block 1
  i. Version 1
    1. Data
    2. Physical location
    3. Length

--- ii. Version n
    1. Data
    2. Physical location
    3. Length

--- b. Block k
  i. Version 1
    1. Data
    2. Physical location
    3. Length

--- ii. Version m
    1. Data
    2. Physical location (*in long term storage*)
    3. Length m'th version of the k'th block shared with file Y

Metadata of file X at T3

10C

FIG. 1E

DUPLICATING A FILE PORTION RESIDING IN A WRITE BUFFER OF A STORAGE SYSTEM

BACKGROUND

A storage system is required to quickly respond to many duplication requests from users (such as host computers, applications hosted by host computers, and the like) that are external to the storage system.

Straight forward duplication of context is time consuming and resource consuming and may exceed the allowable latency.

There is a growing need to provide a solution that is fast, reliable and has a low footprint.

SUMMARY

There may be provided a method, a system, and a non-transitory computer readable medium as illustrated in the application.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 1A-1E are example of clusters;

DETAILED DESCRIPTION OF THE DRAWINGS

Figure 2:
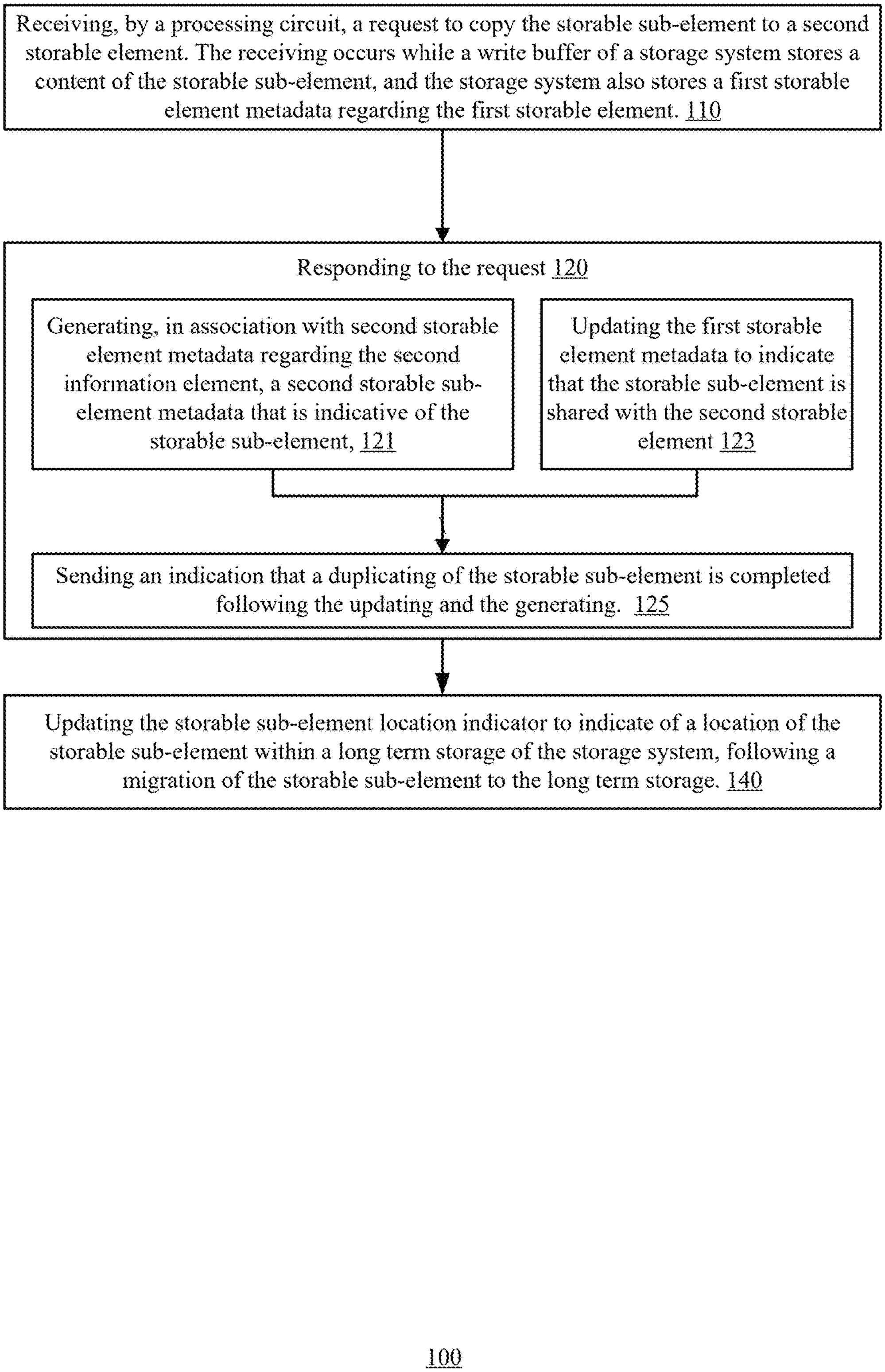
FIG. 2 is an example of a method.

According to an embodiment, a storable element includes information and may also include metadata. Example of a storable element include a file, a directory, and the like. According to an embodiment a storable element includes one or more storable sub-elements.

Instead of straight forward copying content of a storable sub-element, the content is the storable sub-element is shared between storage elements. The sharing involves updating and/or generating metadata regarding the storable sub-element.

Once the sharing initiates the storable sub-element should be protected from being deleted when only some of the sharing storage elements are deleted.

A protection based on counters that count the number of storable elements that share the storable sub-element is applicable in the long term memory of the storage system—as there are various schemed that protect the integrity of the counter and/or of the storable elements—but is not applicable when the storable sub-element is stored in a write buffer—before being migrated to the long term memory. In some storage system the write buffer has a much shorter response time than the long term memory and the control of the write buffer has to be much simpler than those of the long term memory.

According to an embodiment at the absence of counters—the suggested solution is based on updating metadata that describes the links between the sharable storable sub-element and the storable elements that share it.

For simplicity of explanation, the storable element is assumed to be a file, and the storable sub-element is assumed to be a block of a file.

Each file is associated with file metadata that may include metadata regarding the file as well as metadata regarding the blocks of the file.

FIG. 1A illustrates an example of a metadata 10A of a given file (file X) at a first point of time (T1) and includes the physical location of the content (data) of the file, a time of creation of the file, and—for any version of any block of the file—the data of creation of the version of the block, the physical location of the block and the length of the block. Other types of metadata and/or additional types of metadata may be provided.

The metadata 10A is related to a file that includes k blocks. The first block has n versions, block k includes m versions.

Assuming that a given block of a given version (for example the m'th version of the k'th block) is requested to be duplicated to another file (file Y) and that when the request is received the k'th block is stored in the write buffer of the storage system.

According to an embodiment, a response to the request shall include:

a. The metadata of file Y will be amended by adding a description of the m'th version of the k'th block. The physical location field of the metadata of file Y is amended by adding a description of the m'th points to relevant metadata in the metadata of file X.
b. The metadata of file X is amended to indicate (explicitly or implicitly) that erasing of the m'th version of the k'th block may be problematic (if the erasure is requested while file Y still shares the m'th version of the k'th block)—see m'th version of the k'th block shared with file Y—in FIG. 1C.

According to an embodiment the metadata includes a warning such as "do not delete or modify anything from m'th version of the k'th block which occurred before a specified time"

The specified time should correspond to the time of receiving a copy request to copy the m'th version of the k'th block.

Assuming for example that the metadata of file X reads as follows:

a. Block 1—address range R11-R12—has a 11'th version (associated with a {1,11}'th time) and is located at location L11.
b. Block 1—address range R11-R12—has a 12'th version (associated with a {1,12}'th time) and is located at location L12
c. Block 2—address range R21-R22—has a 21'th version (associated with a {2,21}'th time) and is located at location L21
d. Block 3—address range R31-R32—has a 31'th version (associated with a {3,31'th time) and is located at location L31.

Assuming that the storage system receives a request to copy the latest version of block 1 and block 2 from file X to file Y-then the metadata of X file will read as follows:

a. Block 1—address range R11-R12—has a 11'th version (associated with a {1,11}'th time) and is located at location L11.
b. Block 1—address range R11-R12—has a 12'th version (associated with a {1,12}'th time) and is located at location L12 c. Block 2—address range R21-R22—has a 21'th version (associated with a {2,21}'th time) and is located at location L21 d. Block 3—address range R31-R32—has a 31'th version (associated with a {3,31'th time) and is located at location L31.

e. Do not delete or modify anything from Block 1 and Block 2 which occurred before the copy request.

It should be noted that when there are many versions of many blocks and many files-assigning a counter to each one is impractical.

Assuming that file Y was empty before the duplication that occurred at a second point of time (T2) the metadata of file Y 12B (illustrated in FIG. 1B) will refer to the m'th version of the k'th block. It should be noted that the "physical location" will refer to the location of the physical location of the "physical location" field of the metadata of file X—and is thereby denoted "physical location (see metadata of file X)" in FIG. 1B.

The m'th version of the k'th block is eventually migrated to the long term storage. Following the migration the metadata regarding the m'th version of the k'th block should be updated to point to the physical location of the m'th version of the k'th block in the long term storage. In addition—the amendment made to indicate (explicitly or implicitly) that erasing of the m'th version of the k'th block may be problematic—is erased.

See FIG. 1D of metadata of file X 10C in third point of time (T3) and see FIG. 1D of metadata of file Y 12C in T3—in which the physical location is denoted physical location (in long term storage).

FIG. 2 illustrates an example of method 100 for duplicating a storable sub-element of a first storable element.

According to an embodiment, method 100 includes step 110 of receiving, by a processing circuit, a request to copy the storable sub-element to a second storable element; wherein the receiving occurs while a write buffer of a storage system stores a content of the storable sub-element. The storage system also stores a first storable element metadata regarding the first storable element, the first storable element metadata includes storable sub-element metadata that includes a storable sub-element location indicator that is indicative of location of the storable sub-element within the write buffer.

According to an embodiment, step 110 is followed by step 120 of responding the request.

According to an embodiment, step 120 includes:

a. Step 121 of generating, in association with second storable element metadata regarding the second information element, a second storable sub-element metadata that is indicative of the storable sub-element.

b. Step 123 of updating the first storable element metadata to indicate that the storable sub-element is shared with the second storable element.

c. Step 125 of sending an indication that a duplicating of the storable sub-element is completed following the updating and the generating. The indication is sent to the user or computer that sent the request.

According to an embodiment, step 120 is executed without generating or updating a counter for counting a number of information elements that share the storable sub-element.

According to an embodiment, step 120 is executed without duplicating the storable sub-element.

According to an embodiment, the second storable sub-element metadata includes a second storable sub-element location indicator that is indicative of location of the storable sub-element location indicator within the first storable element metadata.

According to an embodiment, method 100 also includes step 140 of updating the storable sub-element location indicator to indicate of a location of the storable sub-element within a long term storage of the storage system, following a migration of the storable sub-element to the long term storage.

According to an embodiment, the write buffer is a non-volatile write buffer sharable by multiple compute nodes of the storage system and wherein the long term storage is distributed between multiple storage nodes of the storage system, the multiple compute nodes and the multiple storage nodes communicate with each other via a network of the storage system.

According to an embodiment, each one of the first and second storable elements is a file.

According to an embodiment, each one of the first and second storable elements is a file system entity.

Figure 3:
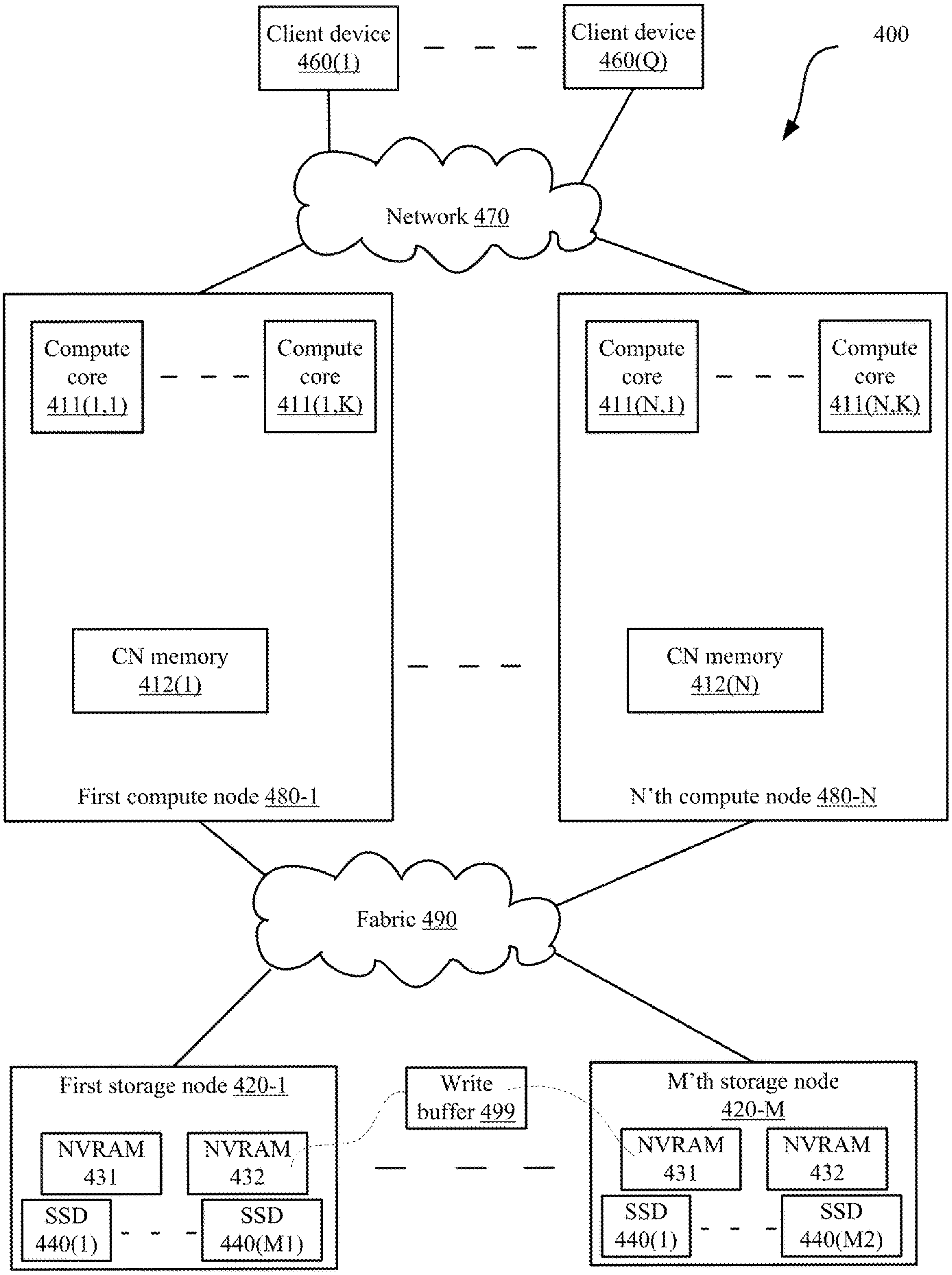
FIG. 3 is an example of a storage system.

FIG. 3 shows an example diagram of a storage system 400 for managing a partially ordered database. The storage system 400 includes N compute nodes—from first compute node 480-1 through the N'th compute node 480-N.

Each compute nodes includes multiple compute cores each—see for example compute cores 411(1,1)-411(1,K) of first compute node 480-1 and compute cores 411(N,1)-411(N,K) of N'th compute node 480-N.

At least a part of the compute node memory is a random access memory-being a volatile RAM or a non-volatile RAM.

According to an embodiment, each compute core is a processing circuit, a part of processing circuit, and the like. A compute node may include at least one of a clustering circuit, re-clustering circuit, query response circuit, and the like—for example one or more of compute cores 411(N,1)-411(N,K) is at least one of a clustering circuit, re-clustering circuit, query response circuit, and the like.

According to an embodiment, each compute node includes a compute node (CN) memory such as CN memory 412(1) of first compute node till CN memory 412(N) of the N'th compute node.

A processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Each compute node 480 interfaces with one or more client devices such as a client devices 460(1)-460(Q) (or an application installed therein) via a network 470, for receiving queries and for sending responses to the queries.

According to an embodiment, the storage system 400 also includes M storage nodes 420-1 through 420-M. The compute nodes and the storage nodes communicate using communication fabric 490. M may equal N or may differ from N.

According to an embodiment, the storage nodes 420 provide the storage and state in the system 400. According to an embodiment, each storage node 420 includes a plurality of SSDs, such as SSDs 440, for example storage node 420-1 includes M1 SSDs 440(1)-440(M1).

According to an embodiment, each storage node 420 includes a plurality of non-volatile random access (NVRAM) memories—such as NVRAM 431 and 432 of each one of first storage node 420-1 and M'th storage node 420-M.

According to an embodiment the write buffer (denoted 499 in FIG. 3) resided in one or more of the NVRAMs. According to an embodiment the one or more NVRAMs also store storable element metadata regarding one or more storable elements (such as the first storable element metadata.

Any reference to "may be" should also refer to "may not be".

In the foregoing detailed description, numerous specific details are set forth to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks, circuit elements, or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather, the scope of the embodiments of the disclosure is defined by the appended claims and equivalents thereof.

We claim:

1. A method for duplicating a storable sub-element of a first storable element, the method comprises:

receiving, by a processing circuit, a request to copy the storable sub-element to a second storable element; wherein the receiving occurs while a write buffer of a storage system stores a content of the storable sub-element; wherein the storage system also stores a first storable element metadata regarding the first storable element, the first storable element metadata comprises storable sub-element metadata that includes a storable sub-element location indicator that is indicative of location of the storable sub-element within the write buffer; and responding the request, wherein the responding comprises:

generating, in association with second storable element metadata regarding the second information element, a second storable sub-element metadata that is indicative of the storable sub-element;

updating the first storable element metadata to indicate that the storable sub-element is shared with the second storable element; and sending an indication that a duplicating of the storable sub-element is completed following the updating and the generating.

2. The method according to claim 1, wherein the responding to the request is executed without generating or updating a counter for counting a number of information elements that share the storable sub-element.

3. The method according to claim 1, wherein the responding to the request is executed without duplicating the storable sub-element.

4. The method according to claim 1, wherein the second storable sub-element metadata comprises a second storable sub-element location indicator that is indicative of location of the storable sub-element location indicator within the first storable element metadata.

5. The method according to claim 1, further comprising updating the storable sub-element location indicator to indicate of a location of the storable sub-element within a long term storage of the storage system, following a migration of the storable sub-element to the long term storage.

6. The method according to claim 5, wherein the write buffer is a non-volatile write buffer sharable by multiple compute nodes of the storage system and wherein the long term storage is distributed between multiple storage nodes of the storage system, the multiple compute nodes and the multiple storage nodes communicate with each other via a network of the storage system.

7. The method according to claim 1, wherein each one of the first and second storable elements is a file.

8. The method according to claim 1, wherein each one of the first and second storable elements is a file system entity.

9. A non-transitory computer readable medium that stores instructions that once executed by a storage system, causes the storage system to:

receive a request to copy the storable sub-element to a second storable element; wherein the receiving occurs while a write buffer of a storage system stores a content of the storable sub-element; wherein the storage system also stores a first storable element metadata regarding the first storable element, the first storable element metadata comprises storable sub-element metadata that includes a storable sub-element location indicator that is indicative of location of the storable sub-element within the write buffer; and respond the request, wherein the responding comprises:

generating, in association with second storable element metadata regarding the second information element, a second storable sub-element metadata that is indicative of the storable sub-element;

updating the first storable element metadata to indicate that the storable sub-element is shared with the second storable element; and sending an indication that a duplicating of the storable sub-element is completed following the updating and the generating.

10. The method according to claim 1, wherein the responding to the request is executed without generating or updating a counter for counting a number of information elements that share the storable sub-element.

11. The method according to claim 1, wherein the responding to the request is executed without duplicating the storable sub-element.

12. The method according to claim 1, wherein the second storable sub-element metadata comprises a second storable sub-element location indicator that is indicative of location of the storable sub-element location indicator within the first storable element metadata.

13. The method according to claim 1, further comprising updating the storable sub-element location indicator to indicate of a location of the storable sub-element within a long term storage of the storage system, following a migration of the storable sub-element to the long term storage.

14. The method according to claim 5, wherein the write buffer is a non-volatile write buffer sharable by multiple compute nodes of the storage system and wherein the long term storage is distributed between multiple storage nodes of the storage system, the multiple compute nodes and the multiple storage nodes communicate with each other via a network of the storage system.

15. The method according to claim 1, wherein each one of the first and second storable elements is a file.

16. The method according to claim 1, wherein each one of the first and second storable elements is a file system entity.

17. A storage system that comprises:

a write buffer;

a processing circuit that is configured to:

receive a request to copy the storable sub-element to a second storable element; wherein the receiving occurs while the write buffer stores a content of the storable sub-element; wherein the storage system also stores a first storable element metadata regarding the first storable element, the first storable element metadata comprises storable sub-element metadata that includes a storable sub-element location indicator that is indicative of location of the storable sub-element within the write buffer; and respond the request, wherein the responding comprises:

generating, in association with second storable element metadata regarding the second information element, a second storable sub-element metadata that is indicative of the storable sub-element;

updating the first storable element metadata to indicate that the storable sub-element is shared with the second storable element; and sending an indication that a duplicating of the storable sub-element is completed following the updating and the generating.

18. The storage system according to claim 17, further comprising a long term storage; wherein the processing circuit is further configured to update the storable sub-element location indicator to indicate of a location of the storable sub-element within the long term storage of the storage system, following a migration of the storable sub-element to the long term storage.

19. The storage system according to claim 18, further comprising multiple compute nodes, a network, and multiple storage nodes; wherein the write buffer is a non-volatile write buffer that is sharable by the multiple compute nodes; wherein the long term storage is distributed between the multiple storage nodes, and whereon the multiple compute nodes and the multiple storage nodes communicate with each other via the network.

* * * * *